US006853713B1

United States Patent
Fobert et al.

(10) Patent No.: US 6,853,713 B1
(45) Date of Patent: Feb. 8, 2005

(54) CLIENT-SERVER NETWORK FOR MANAGING INTERNET PROTOCOL VOICE PACKETS

(75) Inventors: Joseph Fobert, Chapel Hill, NC (US); Srivallipuranandan Navaratnam, Durham, NC (US); Patrick James Dagert, Raleigh, NC (US); Steve John McKinnon, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/466,619

(22) Filed: Dec. 17, 1999

(51) Int. Cl.$^7$ .............................................. H04M 1/56
(52) U.S. Cl. ........................ 379/142.17; 379/373.01; 370/356
(58) Field of Search ................... 379/373.01, 142.17, 379/201.01, 88.19, 88.21, 93.01, 88.17, 100.05, 88.2, 88.14; 370/356

(56) References Cited

U.S. PATENT DOCUMENTS

| 5,533,102 | A | * | 7/1996 | Robinson et al. | 379/88.25 |
| 5,668,862 | A | | 9/1997 | Bannister et al. | 379/201 |
| 5,875,239 | A | * | 2/1999 | Koralewski et al. | 379/142.15 |
| 5,946,381 | A | * | 8/1999 | Danne et al. | 379/142.07 |
| 5,946,386 | A | * | 8/1999 | Rogers et al. | 379/265.09 |
| 6,141,341 | A | * | 10/2000 | Jones et al. | 370/352 |
| 6,243,448 | B1 | * | 6/2001 | Corbett et al. | 379/93.35 |
| 6,282,269 | B1 | * | 8/2001 | Bowater et al. | 379/88.17 |
| 6,539,077 | B1 | * | 3/2003 | Ranalli et al. | 379/67.1 |
| 6,636,596 | B1 | * | 10/2003 | Gallant et al. | 379/220.01 |
| 2001/0043687 | A1 | * | 11/2001 | Tidwell et al. | 379/110.01 |
| 2002/0122072 | A1 | * | 9/2002 | Selker | 345/834 |
| 2002/0147696 | A1 | * | 10/2002 | Acker et al. | 707/1 |

FOREIGN PATENT DOCUMENTS

| DE | 19644210 A1 | 4/1997 | H04M/3/42 |
| EP | 0829995 A2 | 3/1998 | H04M/3/00 |
| EP | 0 844 799 A2 | 5/1998 | H04M/3/38 |
| WO | WO 99/05590 | 2/1999 | G06F/3/00 |

OTHER PUBLICATIONS

Duxbury, David, Backhouse, Rob, Head, Mike, et al., "Call Centres in BT UK Customer Service," British Telecommunications Engineering, vol. 18, pp. 165–173, Oct. 1999, XP–000877997.

Kagata, Shun, "'Number Display' Changes the World of Telecommunications," NTT Review, vol. 10, No. 2, pp. 20–25, Mar. 1998, XP–000740447.

Zellweger, Polle T., Terry, Douglas B., and Swinehart, Daniel C., "An Overview of the Etherphone System and its Applications," Washington, IEEE Comp. Soc. Press, US, vol. Conf. 2, Santa Clara, pp. 160–168, Mar. 1988, XP–000617541.

* cited by examiner

Primary Examiner—Fan Tsang
Assistant Examiner—Olisa Anwah
(74) Attorney, Agent, or Firm—Withrow & Terranova, PLLC

(57) ABSTRACT

A client-server network for managing internet protocol voice data packets includes a client terminal, for receiving internet protocol voice data packets; a graphical display, for conveying information to a client terminal user; a client terminal controller, for controlling the client terminal; a terminal proxy server, responsive to the internet protocol voice data packets, for sending synchronized signals to the client terminal and the client terminal controller to notify a client terminal user of the voice data packets, the client terminal controller, in response to the synchronized signal, adapted to retrieve information about the incoming caller and convey the information to the client terminal user on the graphical display; and a graphical user interface, displayed on the graphical display, for receiving instructions from the client terminal user, the client terminal controller, in response to instructions received from the user through the graphical user interface, adapted to perform at least one data manipulation task on the voice data packets.

11 Claims, 11 Drawing Sheets

Fig. 8

CLIENT-SERVER NETWORK FOR MANAGING INTERNET PROTOCOL VOICE PACKETS

TECHNICAL FIELD

This invention relates generally to internet telephony, and more particularly to an internet telephony network for managing voice packet data.

BACKGROUND ART

Internet Protocol (IP) telephony is the process of converting voice into data packets for transmission on a data network such as a Transmission Control Protocol/Internet Protocol (TCP/IP) or similar type network. The advantage of IP telephony over conventional, dedicated line telephone networks is that instead of relying on a physical telephone link and an associated telephone number identifying that physical link to establish a connection, an IP address directs the call to the appropriate IP device. Moreover, although compatible with the existing Publicly Switched Telephone Network (PSTN) such that local IP telephony networks can receive calls from the PSTN accompanied by the proper conversion device, IP telephony takes advantage of existing data networks such that long distance telephone calls can be made over the internet without incurring long distance charges.

Accordingly, IP telephony, particularly in business applications, has become increasingly popular, and telephones have been expressly designed for use with internet protocol. Conventional telephones, with the assistance of a station gateway that converts the voice signals to data packets, can also communicate using internet protocol. Some IP telephone sets provide a small graphical display for the user's benefit, however, many do not. Therefore, the amount of information available to a user to identify the person calling before the user takes the call is very limited. Typical telephone appliance displays provide at most a telephone number of the calling party and identify on which line the incoming call is received. Moreover, the information available to a user (if any) with respect to the incoming call is extremely limited partially due to the reduced, even lack of, graphical display, but even more so due to the limited intelligence these IP telephony devices have, further limiting the type, amount and manner in which the information can be displayed.

Accordingly, because IP telephony is limited in the amount of information that can be conveyed to a user regarding a caller, management of calls, e.g. taking a call, sending a call to voice mail, and even ignoring a call, is not effectively accomplished. Indeed, even with caller ID readily available making it possible to determine who is calling or being sent to voice mail, there is no way to monitor the remotely located voice mail to listen to the message as it is being left by the caller.

DISCLOSURE OF THE INVENTION

The present invention results from the realization that a truly effective client server IP network for managing voice packet data can be achieved in which a terminal proxy server, in response to an incoming IP telephone call, simultaneously sends synchronized signals to a client terminal and to a client terminal controller notifying a user of the incoming call. The client terminal controller, in response thereto, retrieves information about the incoming caller, displays the information for the user and through a graphical user interface responsive to the user, the client terminal controller performs at least one call management task on the incoming voice data packets.

This invention results from the further realization that a voice mail message can be monitored in real time and even interrupted as the message is being left by a caller by establishing a conference call with the voice mail storage device and the caller and dropping the voice mail storage device from the call should the user wish to answer the call.

The invention features a client-server network for managing IP voice data packets. There is a client terminal for receiving IP voice data packets from a caller and a graphical display for conveying information to a client terminal user. A client terminal controller controls the client terminal. A terminal proxy server, responsive to internet protocol control data packets, simultaneously sends synchronized signal to the client terminal to and the client terminal controller to notify a client terminal user of the incoming voice data packets. The client terminal controller, in response to the terminal proxy server, retrieves information about the incoming caller and conveys the information to the client terminal user on the graphical display. A graphical user interface is provided for receiving instructions from the client terminal user. The client terminal controller, in response to the instructions received from the user through the graphical user interface, performs at least one call management task on the incoming voice data packets.

The client-server network can include a database from which the client terminal controller retrieves the information. The database can include an address book database or the database can include a Lightweight Directory Access Protocol server. The client terminal can include an IP telephone, a set top box or a personal computer. The client terminal can also include an IP gateway, for converting voice data packets to voice signals and a telephone for receiving the voice signals. The graphical display can include a television screen or a computer screen display.

The present invention also features a method of monitoring a voice mail message. The method includes sending an incoming telephone call addressed to a client terminal to a voice mail storage device and establishing a conference call between the client terminal and the voice mail storage device.

The method can include muting the conference call between the client terminal and the voice mail storage device, establishing a speech path between the client terminal and the voice mail storage device or dropping the voice mail storage device from the conference.

The invention features still further a method of automatically updating an address book database. The method includes determining from an incoming telephone call the address of the incoming telephone call and searching a lightweight directory access protocol server for information corresponding to the address of the incoming telephone call, retrieving from the lightweight directory access protocol server the information corresponding to the address of the incoming telephone call and downloading the retrieved information to an address book database.

The method can further include searching the address book database for information corresponding to the address of origin prior to searching the lightweight directory access protocol server. The lightweight directory access protocol server can be located within a data network.

The invention also features a client-server network for managing IP voice data packets. There is a client terminal for receiving IP voice data packets from a caller and a graphical display for conveying information to a client terminal user. A client terminal controller controls the client terminal and a terminal proxy server, responsive to internet protocol control data packets, sends a signal to the client terminal controller to notify a client terminal user of the incoming voice data packets. The client terminal controller, in response the terminal proxy server, retrieves information about the incoming caller and conveys the information to the client terminal user on the graphical display. A graphical user interface is provided for receiving instructions from the client terminal user. The client terminal controller, in response to the instructions received from the user through the graphical user interface, performs at least one call management task on the incoming voice data packets.

It is therefore an object off the present invention to provide a novel, effective client-server network for managing voice data packets.

An object of the invention having been stated hereinabove which is achieved in whole or in part by the present invention, other objects will become evident as the description proceeds when taken in connection with the accompanying drawings as best described hereinbelow.

BRIEF DESCRIPTION OF THE DRAWINGS

FIG. 8 is a representation, similar to FIG. 7, of an address book address that can be automatically updated through a Lightweight Data Access Protocol server;

DETAILED DESCRIPTION OF THE INVENTION

The network according to the present invention provides the user of an internet protocol telephony device the ability to originate, answer and manage telephone calls from a personal computer, automatically access a Lightweight Directory Access Protocol (LDAP) server to automatically update an address book database, and monitor and screen voice mail messages while they are being recorded, as well as interrupt voice mail messages to speak with the caller.

Figure 1:
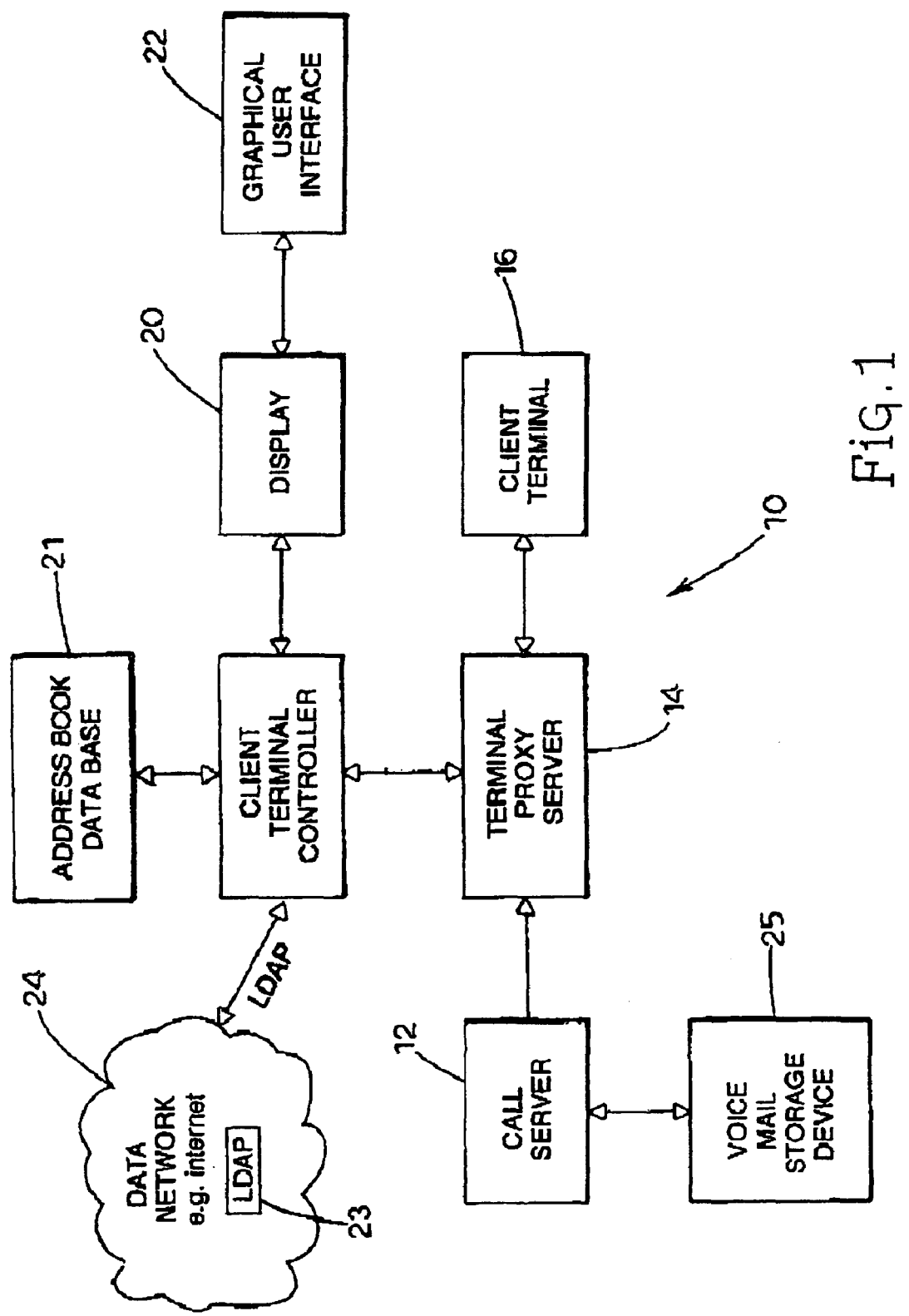
FIG. 1 is a schematic block diagram generally depicting the client server network for managing internet protocol voice data packets according to the present invention.

There is shown in FIG. 1 a network generally designated 10 for managing voice packet data according to the present invention. Network 10 can generally include a call server 12, for sending and receiving telephone calls to and from network 10, and a terminal proxy server (TPS) 14 for controlling both call server 12 and a client terminal 16. Client terminal 16 can include, for example, an internet protocol (IP) telephone, a cable television set top box having telephony capability, or a personal computer, each of which can communicate using internet protocol. Also included within network 10 is a client terminal controller 18 that communicates directly with TPS 14 to control and manage voice data packets, not shown, within network 10. As will be readily apparent to those skilled in the art, TPS 14 is adapted to communicate with client terminals 16 having varying intelligence that operate on protocol types ranging from stimulus (least intelligent, e.g., stationary gateway) to functional (most intelligent, e.g., personal computer).

In communication with client terminal controller 18 is a graphical display 20 which graphically conveys information to a user through a graphical user interface 22 regarding an incoming call. Graphical user interface 22 receives instructions from a user for managing the incoming IP voice data packet telephone call. Graphical display 20, for example, a computer monitor for a personal computer or a television screen used in conjunction with a television set top box, is coupled to an intelligent device (e.g., the personal computer or the set top box) thereby providing graphical user interface capability and permitting much more information to be conveyed to a user. This allows a user to effectively manage telephone calls without going to the telephone. Client terminal controller 18 is also in communication with a data network 24 such as the internet.

In operation, call server 12 receives an incoming telephone message, the call set-up signaling comprised of control data packets, and translates the message into H.323 protocol. The H.323 protocol message contains a directory number and an address number for TPS 14. TPS 14 receives the H.323 protocol message from call server 12 and translates the message to a suitable application protocol, such as, for example UNISTIM, available from Nortel Networks, Saint John Canada and MEGACO (Media Gateway Control Protocol), which is an industry standard protocol, available from the Internet Engineering Task Force (an industry cooperative) just to name a couple, which contains the address of client terminal 16 as well as other client terminals, not shown. At the same time that TPS 14 converts and sends the message to client terminal 16, TPS 14 converts and sends a simultaneous message, typically in another protocol such as Remote Method Invocation (RMI), to client terminal controller 18. The application protocols above are utilized merely to facilitate communication between TPS 14 and client terminal 16 and between TPS 14 and client terminal controller 18, as will be readily apparent to those skilled in the art, and therefore should not be viewed as limitations to the present invention as any suitable application protocols, including vender specific protocols, can be utilized in accordance with this invention.

TPS 14 sends the converted protocol messages simultaneously so that client terminal 16 and client terminal controller 18 are synchronized; that is, there is no delay between the time when client terminal controller 18 receives the signal of an incoming call and when client terminal 16 receives the signal. In other words, as client terminal 16 indicates to a user that there is a telephone call, for example by ringing, client terminal controller 18 generates graphical user interface 22 such as a pop-up window which appears on graphical display 20 at the same time.

In response to the message from TPS 14 and based on sender information contained within the translated message (e.g., the sender's address), client terminal controller 18 retrieves information about the caller, identifying the caller. The information retrieval can be accomplished by accessing the user's own address book database 21 or by querying a Lightweight Directory Access Protocol (LDAP) server 23 via data network 24. The user can then manage the incoming call, for example by answering the call (connecting the call to client terminal 16), taking a message (connecting the call directly to a voice mail storage device 25 remote from client terminal 16), taking a message and monitoring the message, or letting the phone ring until the caller is automatically placed into voice mail. The user can also answer the call, and place the new call or an existing call on hold, or bypass voice mail and ignore the call (letting the incoming call ring with no answer.)

Figure 2:
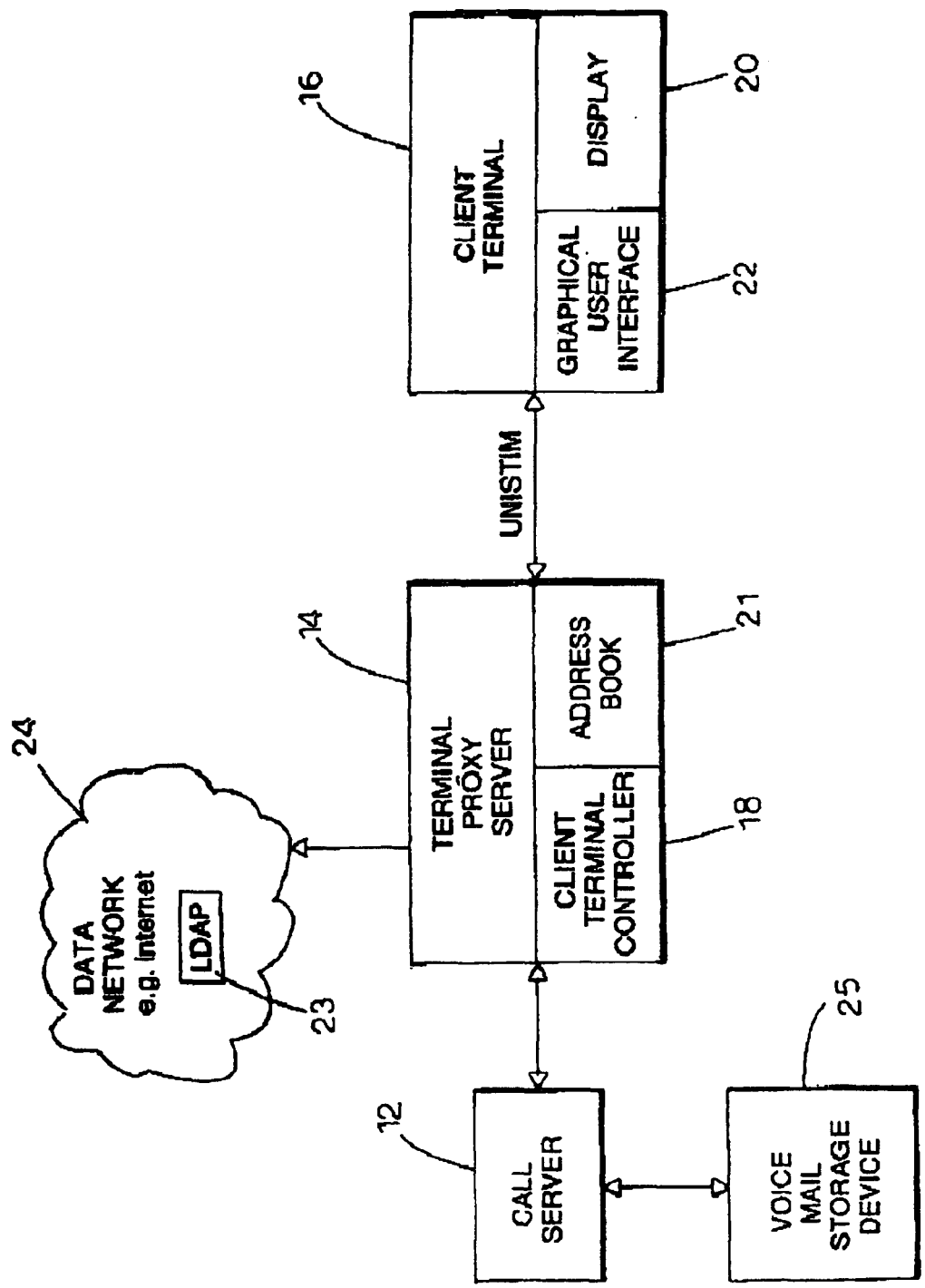
FIG. 2 is a block diagram, similar to FIG. 1, in which a client terminal controller and an address book are integrated with the terminal proxy server.
Figure 3:
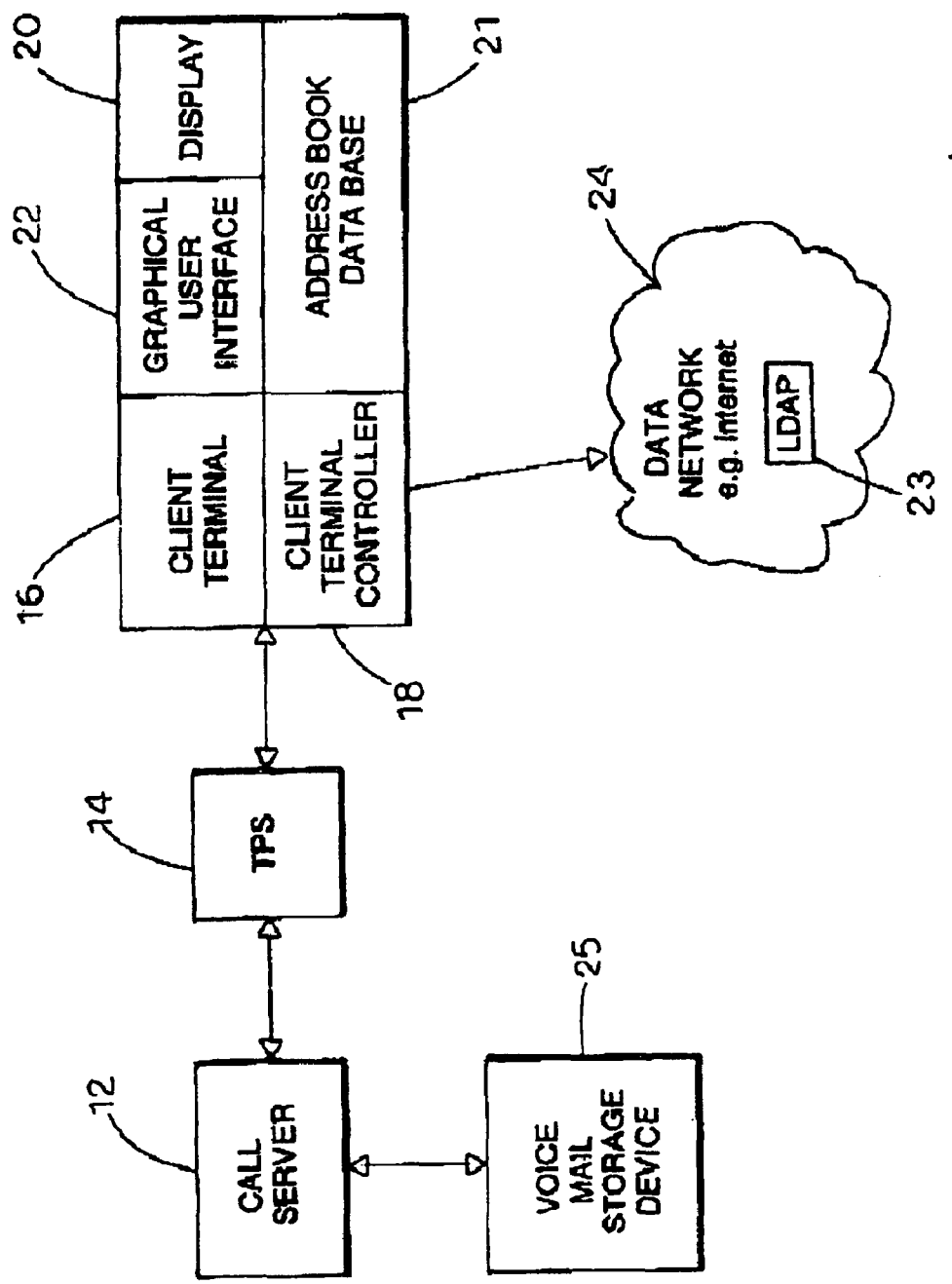
FIG. 3 is a block diagram, similar to FIG. 2, in which a client terminal controller, a display, a graphical user interface and an address book are integrated into a client terminal.

Client terminal controller 18 and address book database 21, as shown in FIG. 2, can be integrated with TPS 14 while display 20 and graphical user interface 22 are integrated with client terminal 16. As shown in FIG. 3, however, client terminal controller 18, display 20, address book database 21 and graphical user interface 22 can all be integrated into client terminal 16.

Figure 4:
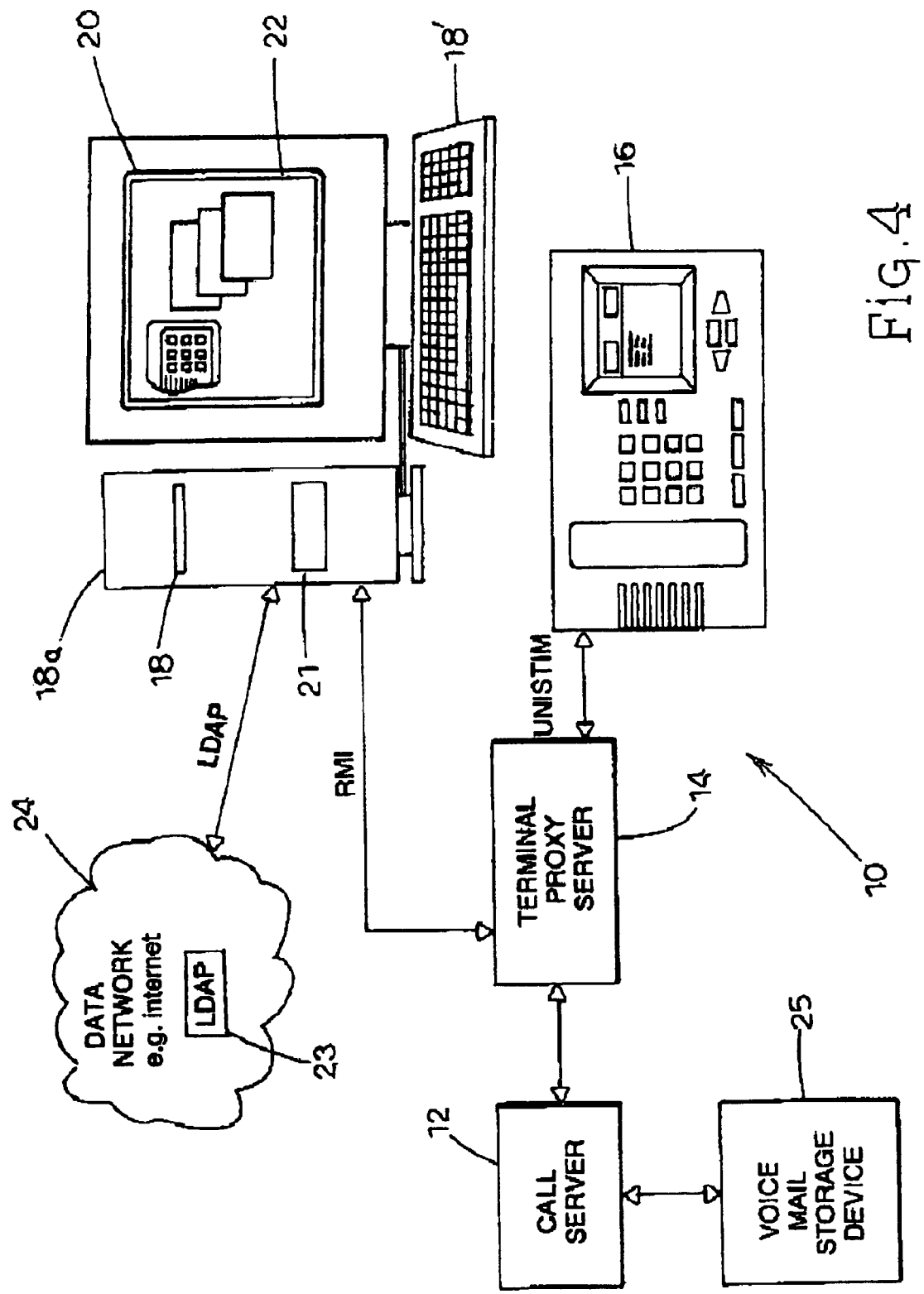
FIG. 4 is a more detailed block diagram of FIG. 1 of an embodiment of the present invention in which a client terminal includes an internet protocol telephone and the client terminal controller is incorporated within a personal computer.

In one embodiment of the present invention, as shown in FIG. 4, client terminal 16 can include an internet telephone set, for example an 12004 IP telephone available from Nortel Networks, Saint John, Canada, and client terminal controller 18 can be stored within the memory of a personal computer 18a. Display 20 comprises a computer screen that displays graphical user interface 22 which can, for example, be a window-based program so that the user can manage the incoming call, using a data input device such as keyboard 18a' to communicate with graphical user interface 22, as desired.

Figure 5:
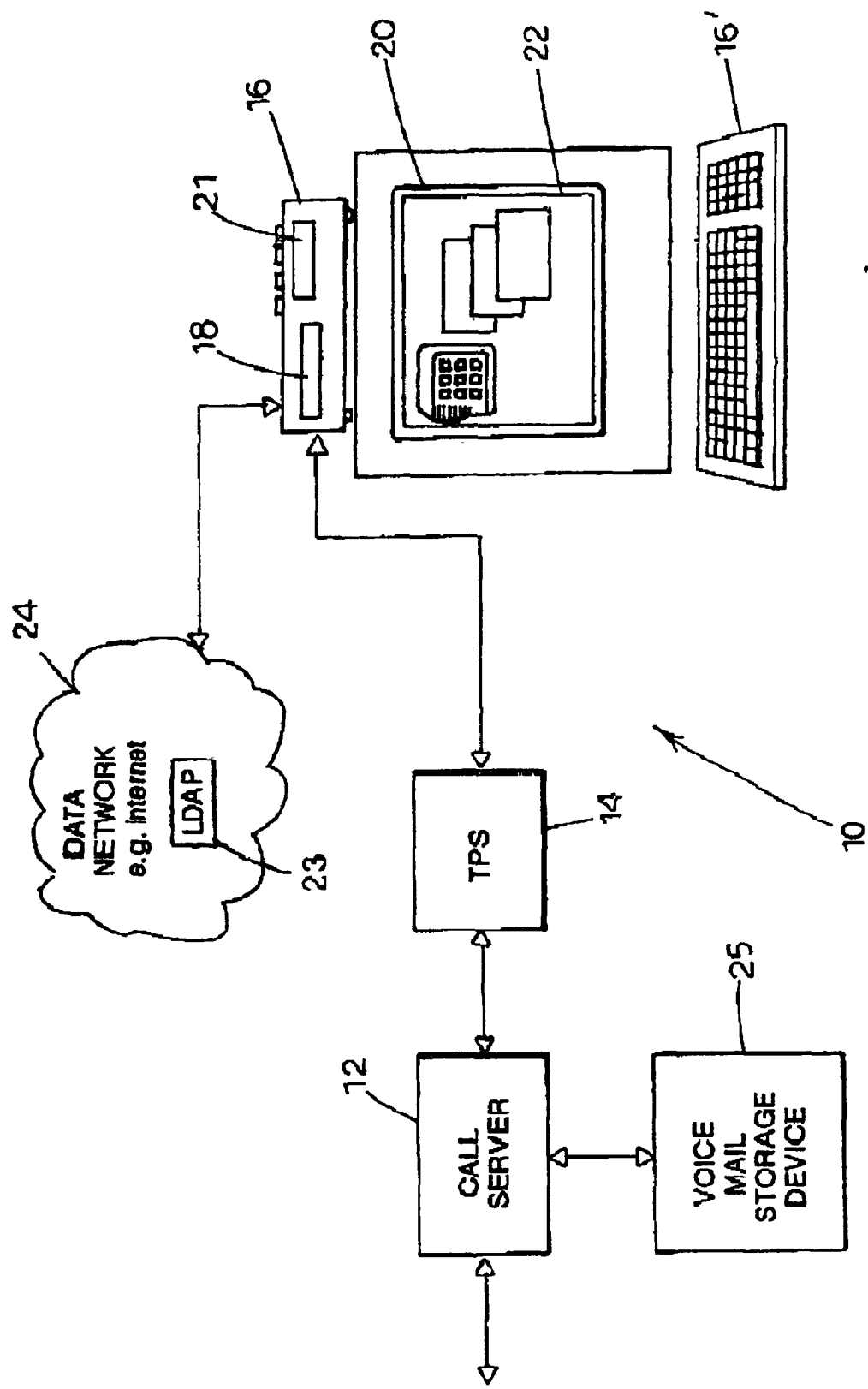
FIG. 5 is a block diagram, similar to FIG. 4, of another embodiment of the present invention in which the client terminal includes a television set top box and the display includes a television set.

In another embodiment of the present invention, as shown in FIG. 5, client terminal 16 can include a cable television set top box having telephony capability, and client terminal controller 18 is stored in memory within cable television set top box 16. Set top box 16 is preferably of the type that enables access to data network 24 such as the internet and that includes a data input device such as keyboard 16'.

Figure 6:
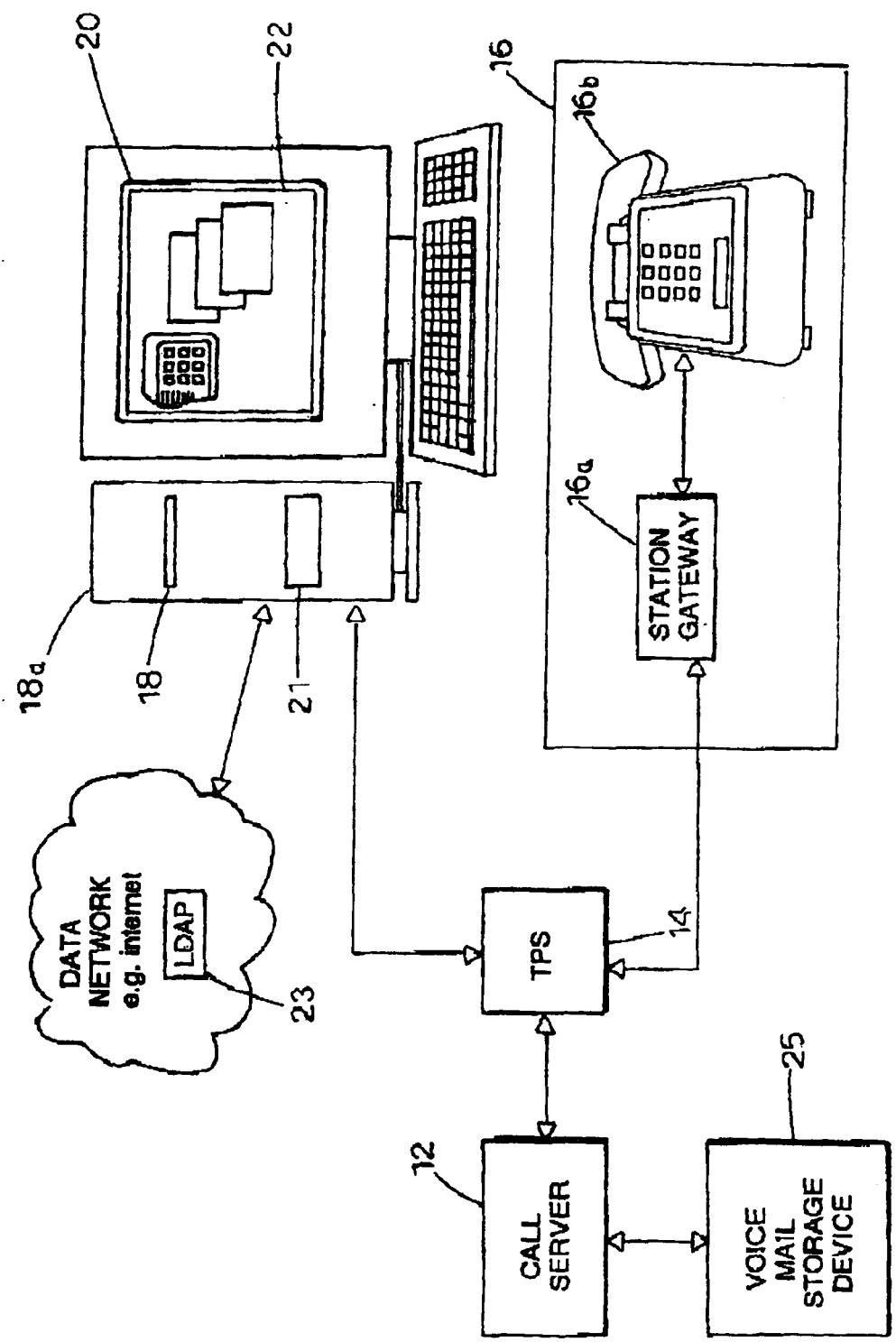
FIG. 6 is a block diagram, similar to FIG. 4, of another embodiment of the present invention in which the client terminal includes an internet protocol gateway and a conventional telephone.

In still another embodiment of the present invention, as shown in FIG. 6, client terminal 16 includes a stationary gateway 16a, which converts conventional voice signals to IP voice data packets, and conventional telephone 16b, such as a touch tone or rotary dial phone.

Figure 7:
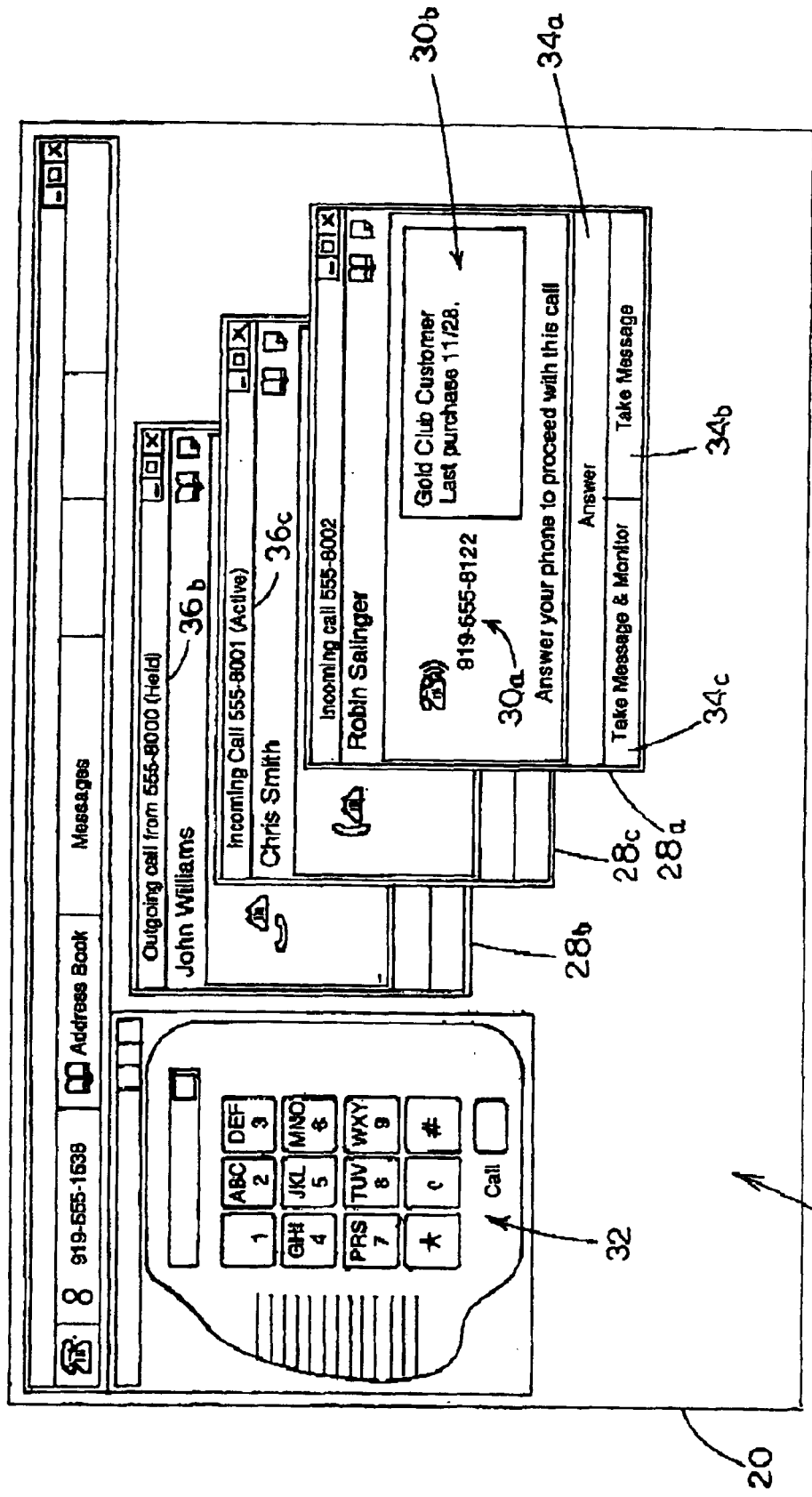
FIG. 7 is a representation of the graphical user interface through which a user instructs the client terminal controller to manage incoming voice data packets according to the present invention.

An exemplary representation of graphical user interface 22 as displayed on display screen 20 is shown in FIG. 7. For example, a user might be working with a desk top application on personal computer 18a (FIG. 4). When an incoming telephone call is detected (i.e., the control data packets), call server 12 (FIGS. 1–6) signals TPS 14 (FIGS. 1–6) which in turn signals client terminal controller 18 (FIGS. 1–6). In response, client terminal controller 18 generates graphical user interface 22 using the intelligence of personal computer 18a, which pops up on display 20. Graphical user interface 22 displays pop-up window 28a which includes information 30a such as the phone number of the incoming caller as well as personal information 30b which can be obtained from the user's address book database 21 stored within computer 18a or from LDAP server 23 via data network 24.

Once the user has been notified of the incoming call, the user can choose to perform one or more call management tasks on the incoming call by clicking ANSWER 34a, which connects the telephone call to client terminal 16 (FIGS. 1–6), TAKE MESSAGE 34b, which connects the call to remote voice mail storage device 25 (FIGS. 1–6), or TAKE MESSAGE & MONITOR 34c, which connects the call to voice mail storage device 25 and conferences the user into voice mail to monitor the message as it is being left by the caller.

Graphical user interface 22, in response to client terminal controller 18, also indicates the status of an incoming call. For example, if the user has placed an outgoing call, as indicated by window 28b, the outgoing call can be placed on hold to take an incoming call (window 28c) and the status of each call is indicated as HELD 36b and ACTIVE 36c within respective windows 28b and 28c.

Figure 8:
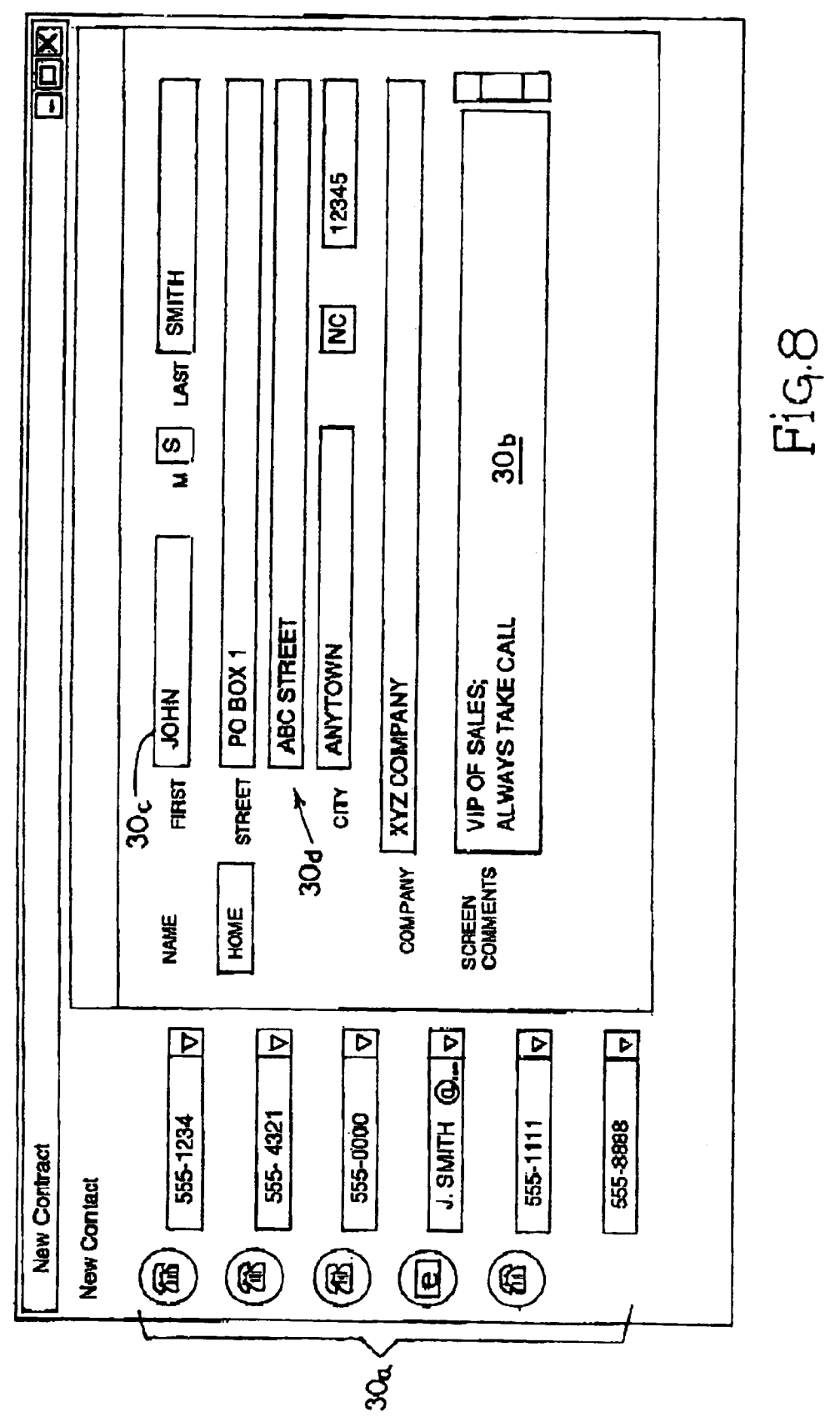

Caller information 30a–30d, as shown in FIG. 8, can automatically be retrieved from address book database 21 (FIGS. 1–6) when an incoming call is detected. Thus, the user can enter important information 30b, for example personal caller information, such that screen pop-up comments immediately convey information to the user about the caller. Moreover, for first time callers for which no information exists within address book database 21, the user can automatically update address book database 21 to add the caller's information such as information 30a, name 30c, and address 30d retrieved from LDAP server 23 (FIGS. 1–6).

Figure 9:
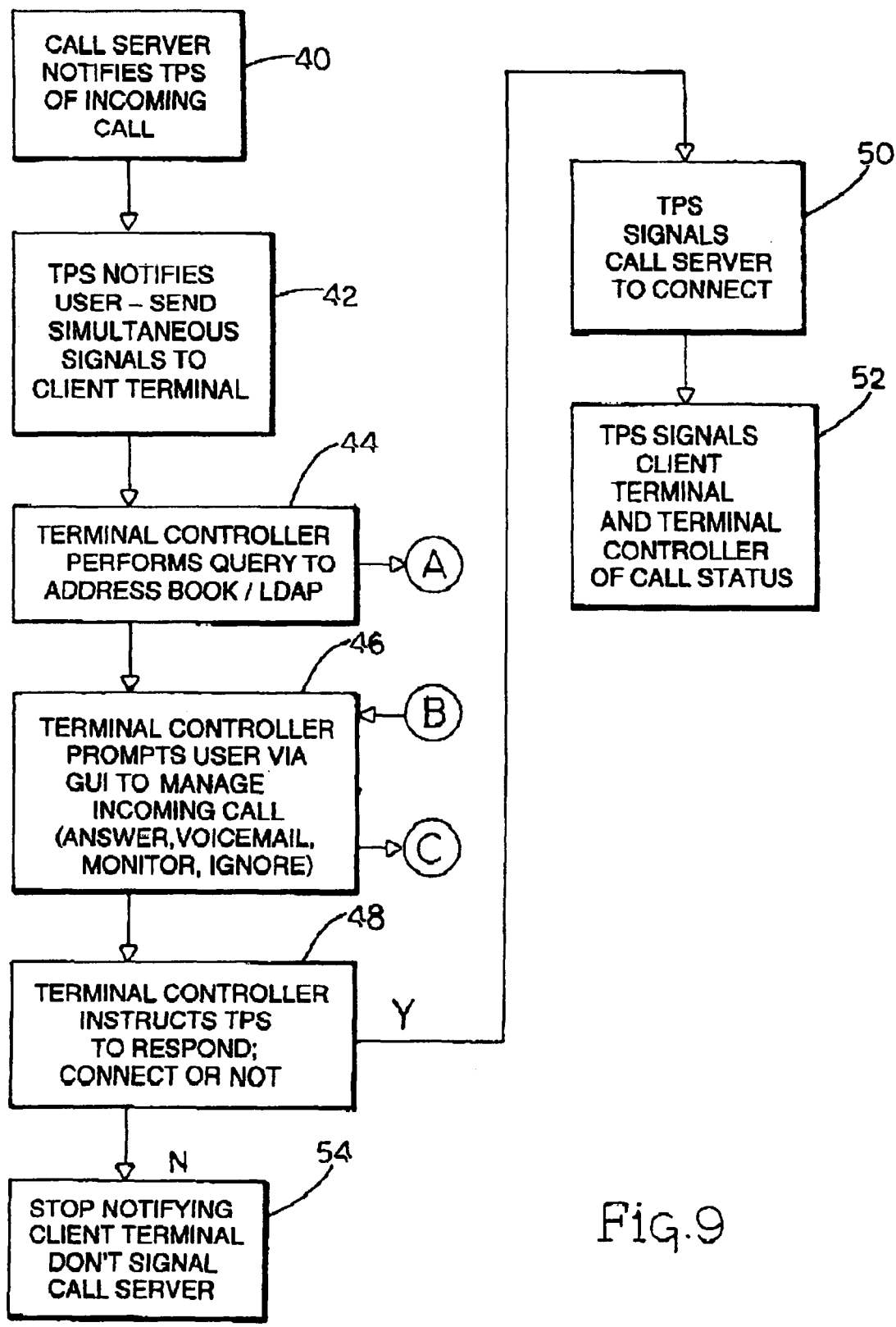
FIG. 9 is a flow chart generally demonstrating the operation of the client server according to the present invention.

Referring now to FIG. 9, the signaling operation of client-server network will be described in greater detail. An incoming IP telephone call signal (a message comprised of a physical layer, an IP layer, a transmission control protocol layer and an application layer) is first detected by call server 12 (FIGS. 1–6), as described in Block 40. Call server 12 translates the message to H.323 protocol and in turn signals TPS 14 (FIGS. 1–6). TPS 14, in response to control data packets contained in the application layer, translates the message again, and simultaneously sends a UNISTIM protocol signal to client terminal 16 (FIGS. 1–6) and an RMI protocol signal to client terminal controller 18 (FIGS. 1–6), as described in Block 42, to notify a user that there is an incoming telephone call.

Client terminal controller 18 determines the address, or phone number, of the incoming call from the application layer and queries address book database 21 (FIGS. 1–6), searching for information corresponding to the address detected. If no match is found, controller 18 queries LDAP server database 23 (FIGS. 1–6) via data network 24 (FIGS. 1–6), as described in Block 44, to retrieve caller information, searching LDAP server 23 for information corresponding to the address of the incoming telephone call.

Still referring to FIG. 9, client terminal controller 18, via graphical user interface 22 (FIGS. 1–7), prompts the user to respond to the incoming call, as described in Block 46. In response to the user's instructions, client terminal controller 18 instructs TPS 14 to connect the incoming call or not, as described in Block 48. If the user chooses to connect the call (i.e., answer the call, send the call to voice mail or send call to voice mail and monitor voice mail), TPS 14 signals call server 12 to connect the call, as described in Block 50, and TPS 14 signals client terminal 16 to stop notifying the user (e.g., stop phone from ringing), signals client terminal controller 18 of the status 36 (FIG. 7) of the call and connects a voice path to client terminal 16 or voice mail storage device 25 (FIGS. 1–6), as described in Block 52. If client terminal controller 18 signals TPS 14 not to connect, TPS 14 signals client terminal 16 to stop notifying the user and does not signal call server 12 at all, as described in Block 54.

Figure 10:
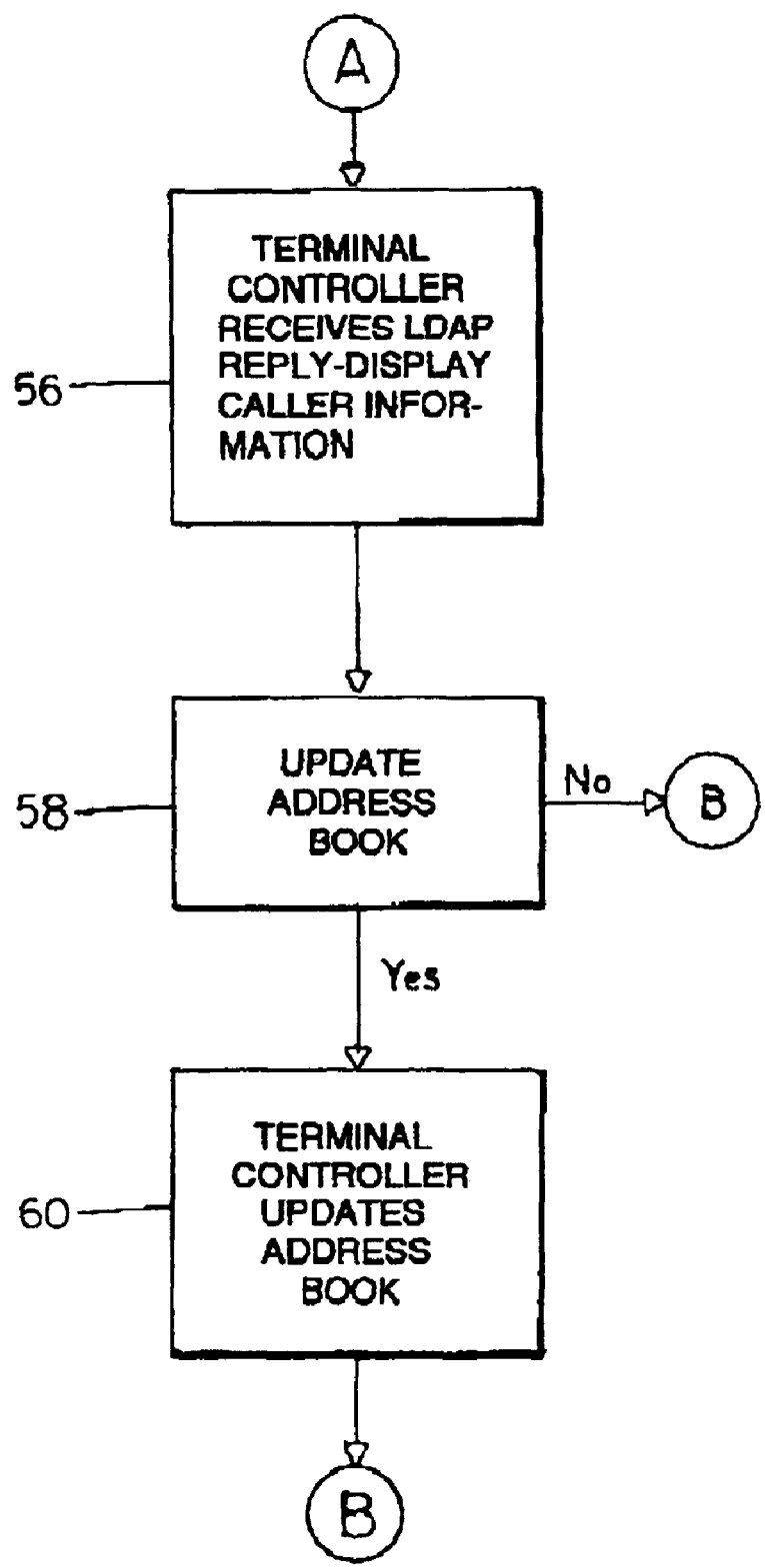
FIG. 10 is a flow chart demonstrating the automatic address book updating according to the present invention.

As discussed above, client terminal controller 18 performs a query to address book database 21 when an incoming call is detected. If the callers phone number is not found in address book database 21, client terminal controller 18 sends a query to LDAP server 23 within data network 24, as described in Block 44, FIG. 9. Referring now to FIG. 10, client terminal controller 18 (FIGS. 1–6) receives a reply from LDAP server 23 (FIGS. 1–6) and displays the caller's information on display screen 20 (FIGS. 1–7) via graphical user interface 22 (FIGS. 1–7), as described in Block 56. The user can then choose to update address book database 21 (FIGS. 1–7), as described in Block 58 by automatically downloading LDAP reply information into address book database 21. If the user chooses to update address book database 21, client terminal controller 18 downloads the new information into address book database 21 as described in block 60. Once the new information has been added to address book database 21, the user can manage the incoming telephone call as discussed above and as described in Block 46, FIG. 9.

As discussed above, voice mail storage device 25 (FIGS. 1–6) is typically remote from client terminal 16. Thus, it typically is not possible to determine who is being sent to voice mail or what voice mail message is being left, thereby preventing call screening of the incoming call. While caller ID features make it possible to determine who is calling, it still has not been possible to monitor the message being left because voice mail storage device 25 is remote from the user. However, one aspect of the present invention permits a user to not only monitor the voice mail message in real time as it is being left, but further allows a user to interrupt the messaging process to take the call.

Figure 11:
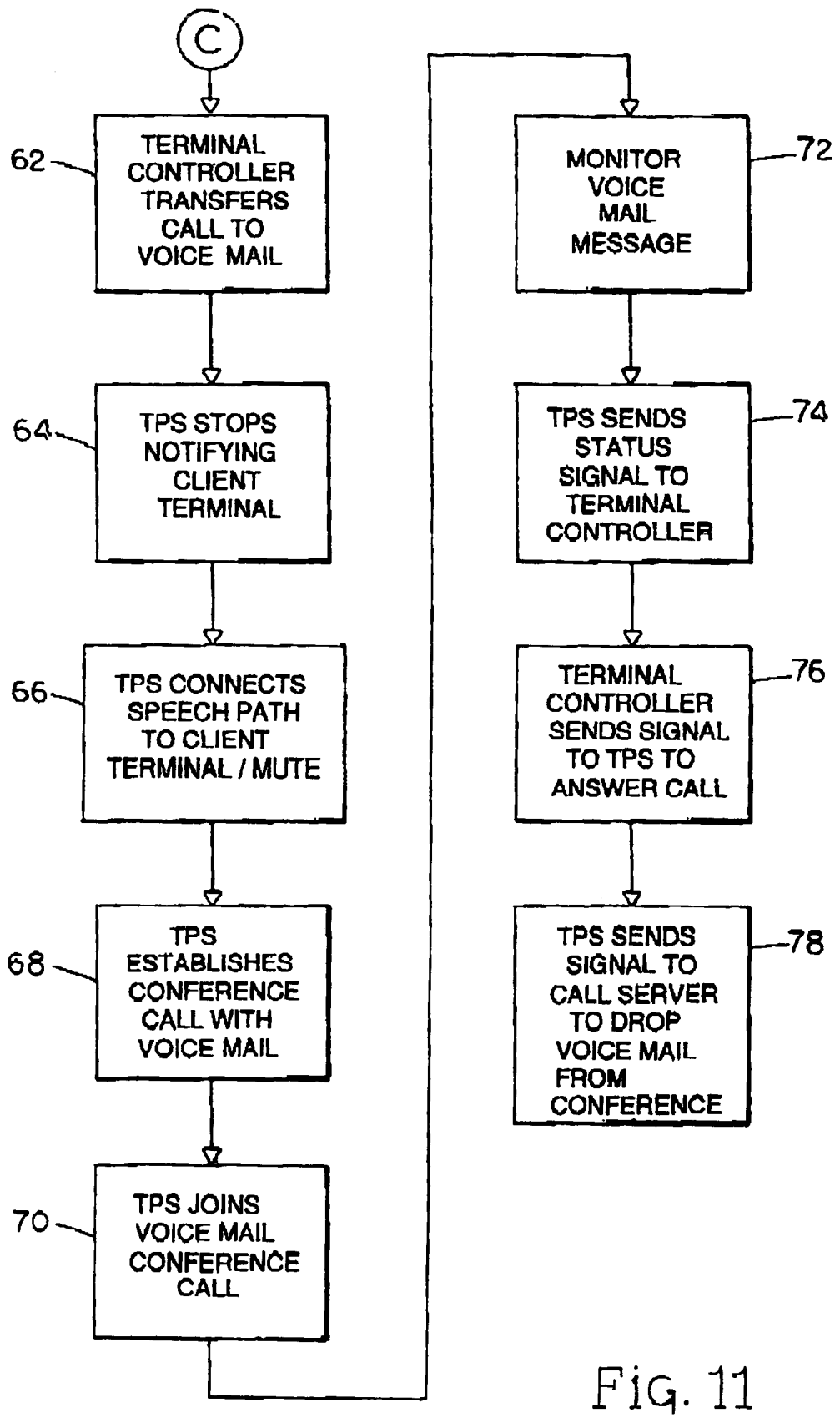
FIG. 11 is a flow chart demonstrating the voice mail monitoring feature of the client-server network according to the present invention.

As discussed above, client terminal controller 18 (FIGS. 1–6) prompts the user to manage the incoming call, as described in Block 46, FIG. 9. Referring now to FIG. 11, the user chooses to send the call to voice mail storage device 25 (FIGS. 1–6) as described in Block 62 and client terminal controller 18 sends a signal to TPS 14 (FIGS. 1–6) to connect the call to voice mail, as described in Block 64. TPS 14 connects a speech path to client terminal 16 (FIGS. 1–6) (e.g., an IP phone) and signals client terminal 16 to mute the call (so that the caller cannot hear the user monitoring the call), as described in Block 66. A conference call is then established with voice mail storage device 25 (FIGS. 1–6) through call server 12 (FIGS. 1–6), as described in Block 68, and TPS 14 joins the call as described in Block 70. Once the user is conferenced into voice mail storage device 25, the user monitors voice mail storage device 25 as described in Block 72, thereby establishing a three way call between client terminal 16, voice mail storage device 25 and the incoming call, and TPS 14 sends a signal to client terminal controller 18 to indicate the voice mail monitor status, as described in Block 74. If the user, via graphical user interface 22 (FIGS. 1–6), chooses to answer the call, client terminal controller 18 sends a signal to TPS 14 to answer the call, as described in Block 74, and TPS 14 sends a signal to call server 12 to drop voice mail storage device 25 from the conference, as described in Block 78.

It will be understood that various details of the invention may be changed without departing from the scope of the invention. Furthermore, the foregoing description is for the purpose of illustration only, and not for the purpose of limitation—the invention being defined by the claims.

What is claimed is:

1. A client-server network for managing internet protocol voice data packets comprising:
    (a) a client terminal, for receiving internet protocol voice data packets from a caller;
    (b) a graphical display, for conveying information to a client terminal user;
    (c) a client terminal controller, for controlling the client terminal;
    (d) a terminal proxy server, responsive to internet protocol control data packets, for sending synchronized signals to the client terminal and the client terminal controller to notify a client terminal user of the incoming voice data packets, the client terminal controller, in response to a synchronized signal, adapted to receive information about the incoming caller and convey the information to the client terminal user on the graphical display; and
    (e) a graphical user interface, for receiving instructions from a client terminal user, the client terminal controller, in response to the instructions received from the user through the graphical user interface, adapted to perform at least one call management task on the voice data packet.

2. The client-server network of claim 1 in which the call management task includes connecting the voice data packets to one of the client terminal and a voice mail storage device.

3. The client-server network of claim 1 further including a database and wherein the client terminal controller is adapted to retrieve the information from the database.

4. The client-server network of claim 3 in which the database comprises an address book.

5. The client-server network of claim 4 in which the database comprises a Lightweight Directory Access Protocol server.

6. The client-server network of claim 1 in which the client terminal comprises an internet protocol telephone.

7. The client server network of claim 1 in which the client terminal comprises a set top box.

8. The client server network of claim 7 in which the graphical display comprises a television screen.

9. The client-server network of claim 1 in which the graphical display comprises a computer screen display.

10. The client-server network of claim 9 in which the client terminal comprises a personal computer.

11. The client-server network of claim 1 in which the client terminal comprises an internet protocol gateway for converting the voice data packets to voice signals and a telephone for receiving the voice signals.

* * * * *